United States Patent [19]

James et al.

[11] 4,070,836

[45] Jan. 31, 1978

[54] BEARING MEMBER

[75] Inventors: Arthur M. James, Beaverton; Edgar Terry Dalton, Lake Oswego, both of Oreg.

[73] Assignee: Arthur M. James, Beaverton, Oreg.

[21] Appl. No.: 713,415

[22] Filed: Aug. 11, 1976

[51] Int. Cl.[2] .......................... E04B 1/36; F16C 17/02

[52] U.S. Cl. .......................................... 52/245; 52/395; 52/396; 52/403; 138/119; 138/145; 277/34.3; 308/3 R

[58] Field of Search ...................... 277/34.3, 34.6, 226; 61/12; 285/13, 14, 417; 138/119, 137, 145; 52/247, 395, 293, 396, 167, 403, 394, 224, 245; 308/3 R, 240

[56] References Cited

U.S. PATENT DOCUMENTS

| | | | |
|---|---|---|---|
| 2,832,614 | 4/1958 | Settle, Jr. | 52/396 X |
| 2,910,209 | 10/1959 | Nelson | 227/226 X |
| 2,918,394 | 12/1959 | Smith | 138/137 |
| 2,981,072 | 4/1961 | Brewington | 285/13 X |
| 3,055,670 | 9/1962 | Sampson | 227/226 X |
| 3,105,252 | 10/1963 | Milk | 52/396 X |
| 3,195,312 | 7/1965 | Rumsey, Jr. | 52/293 X |
| 3,408,784 | 11/1968 | Crowley | 52/395 X |
| 3,561,493 | 2/1971 | Maillard et al. | 138/137 |
| 3,633,328 | 1/1972 | Closner et al. | 52/224 |
| 3,828,504 | 8/1974 | Egerborg et al. | 52/396 |

FOREIGN PATENT DOCUMENTS

| | | | |
|---|---|---|---|
| 241,706 | 12/1962 | Australia | 227/226 |
| 2,327,057 | 12/1974 | Germany | 52/167 |
| 2,157,975 | 5/1973 | Germany | 52/396 |
| 2,166,722 | 10/1975 | Germany | 52/396 |
| 2,412,087 | 9/1975 | Germany | 52/403 |
| 625,520 | 6/1949 | United Kingdom | 52/393 |

*Primary Examiner*—Leslie Braun
*Attorney, Agent, or Firm*—Kolisch, Hartwell, Dickinson & Stuart

[57] ABSTRACT

A bearing member intermediate structural members provide for low friction relative movement of the structural members comprising, in operative position, a flattened tube having an elastic wall and an anti-friction medium deposited within the tube.

8 Claims, 6 Drawing Figures

BEARING MEMBER

This invention relates to a bearing member, and more particularly to such a member which is placed between a pair of structural members where one of such structural members exerts a force on the other, and the bearing member provides an anti-friction intermediary between the two structural members accommodating relative movement of one with respect to the other.

As contemplated by the invention, the bearing member may comprise an elongate tube which is flattened under load. An anti-friction medium inside the tube promotes relative sliding movement of the opposed wall portions in the tube with such in its flattened state. That part of the tube wall which is reversely turned on itself and joining opposite flattened expanses of the tube wall, in a manner of speaking, unrolls on itself with lateral movement of the tube, with the elastic nature of the tube wall enabling increments of flattened regions to move into a reversely turned region, and increments of reversely turned regions to flatten out with the wall recovering where so flattened.

The bearing member contemplated can be used in applications accommodating both vertical and horizontal loads. The bearing members can be produced relatively inexpensively from readily available elastomers. Where a lubricant is employed as the anti-friction medium within the tube, such becomes a permanent part of the bearing member without the need presented of replacing it.

In an embodiment of the invention to be described herein, the bearing member is interposed between the bottom extremity of the cylindrical wall of a tank and a base which provides support for this wall and may also form a floor of the tank. Prestressed concrete tanks have been quite extensively in the storage of fluid, i.e., water. Such walls are subject to a certain amount of radial expansion and contraction, attributable to a number of factors, such as the setting of the concrete making up the wall, the prestressing of the tank by encircling it with high tensile strength reinforcing strands or cables, and the effect of the mass of the liquid within the tank, which mass will vary because of varying liquid levels. With the bearing member contemplated interposed between such a tank wall and a base, the tank wall is enables to move independently of the base with friction maintained at a minimum. Additionally, the bearing member provides a fluid-tight seal inhibiting leakage of the contents of the tank. The bearing member also provides the function of cushioning the wall from shocks caused by earthquakes, vibrations, etc.

The bearing member of the invention may take a number of different forms depending upon the requirements of a particular installation.

The invention, various objects and features thereof, and particulars of various modifications and embodiments, will become more apparent from a reading of the following description, to be taken in conjunction with the accompanying drawings, wherein.

Figure 5:
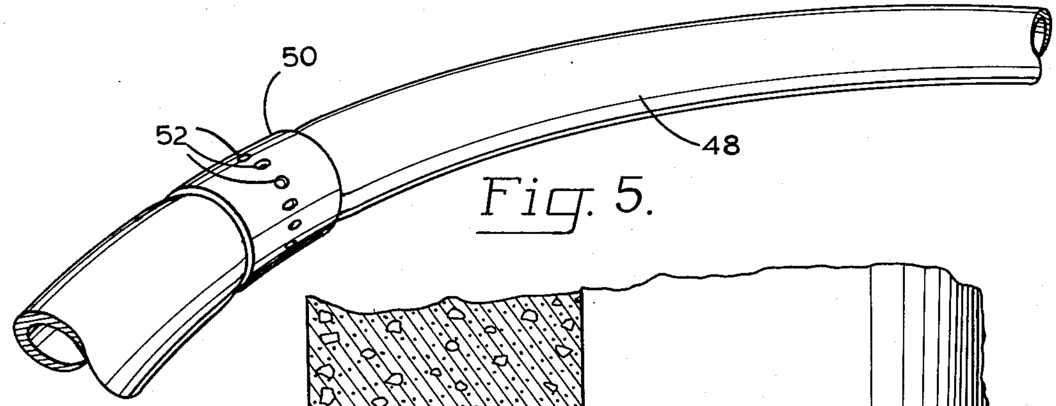
Figure 6:
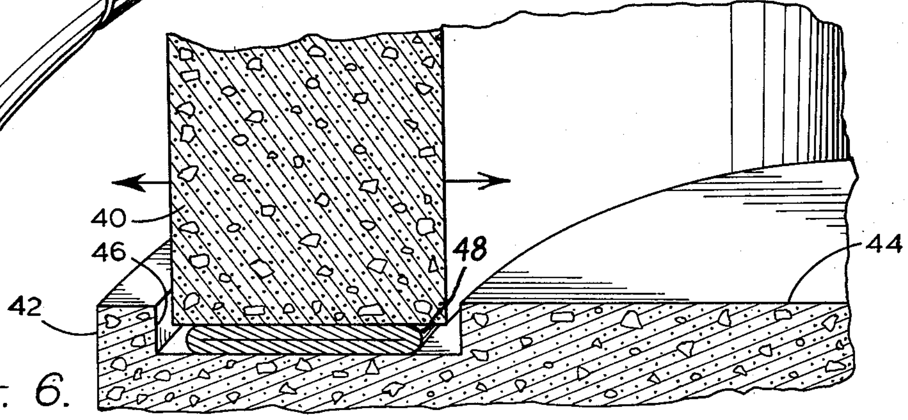

FIG. 5 illustrates portions of a bearing member shaped to extend in an annular course, the bearing member itself having finite length and its ends coupled together with a sleeve; and FIG. 6 illustrates how a bearing member constructed as in FIG. 5 may be incorporated intermediate the bottom end of a cylindrical wall of a tank and a base which supports such wall to accommodate under low friction conditions relative movement of the wall with respect to the base.

Figure 1:
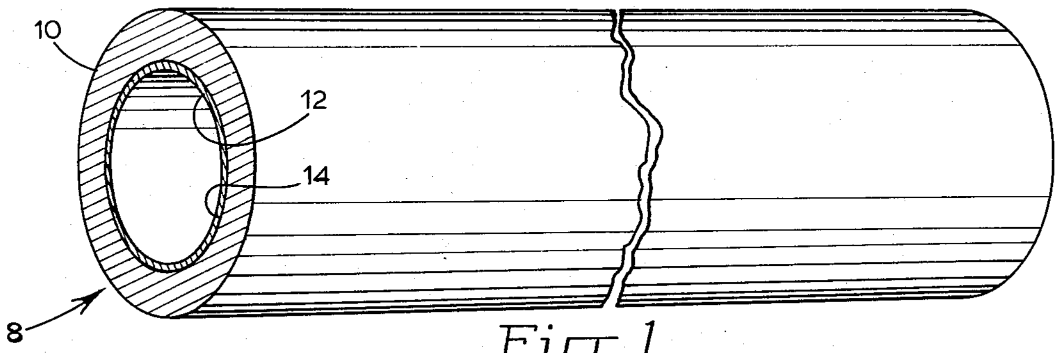
FIG. 1 is a view illustrating portions of a bearing member as contemplated herein.

A bearing member is shown generally at 8 in FIG. 1, comprising a hollow tube of elastomeric material, such as the tube illustrated in FIG. 1 at 10. The term "elastomeric material" as used herein is used broadly, and includes natural rubbers and synthetics, as well as flexible plastics, which are elastic in the sense that they are capable of recovering shape after deformation. The particular material employed may differ from one installation to another, depending upon the requirements of the installation. The tubular member may have a wall which is of an elastomeric composition throughout, or may be fabric-coated, or otherwise reinforced for strength purposes.

The thickness of the wall of the tube is subject to variation. For instance, where the surfaces of the structural members with which the tube is utilized are relatively rough, a thicker wall is indicated than where such surfaces have a smoother characteristic. Greater cushioning is realized with thicker walled tubes. The tube of the bearing member, when installed between opposed structural members, flattens under the load imparted from one structural member to the other. Under conditions of no load, the tube may have the circular outline indicated for tubular member 10 in FIG. 1, or may have an ovate or even flattened cross section resembling a flattened inner tube, as would be the case with relatively thin-walled tubes made of highly elastic materials.

The bearing member contemplated further includes an anti-friction medium deposited on the inner surface of the tube, promoting, with the tube in a flattened condition, relative sliding movement of wall portions which are opposite each other.

In FIG. 1, this anti-friction medium takes the form of a coating 12 of anti-friction material coated over the inner surface 14 of the tube. The coating may be a silicone or other lubricant, such as a lubricating oil, or graphite powder, and partakes of the flexibility of the tube to which it is applied.

In the bearing member as completed, the tube functions as an envelope or encasement for the anti-friction medium inside it. Under conditions of load with the tube flattened out, flattened expanses of wall portions in the tube become oriented directly opposite each other, and the lubricant accommodates sliding movement of these wall portions with respect to each other.

Figure 2:
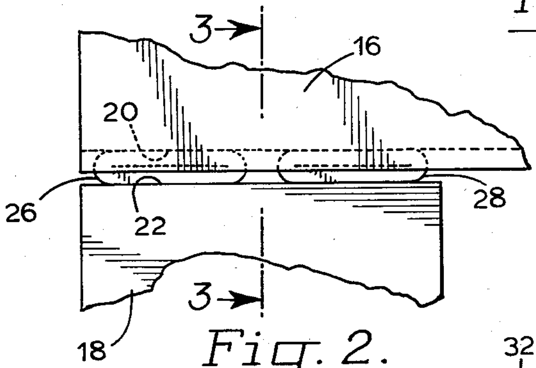
FIG. 2 illustrates a pair of bearing members interposed between two structural members, providing for relative movement under low friction conditions of one structural member with respect to the other.
Figure 3:
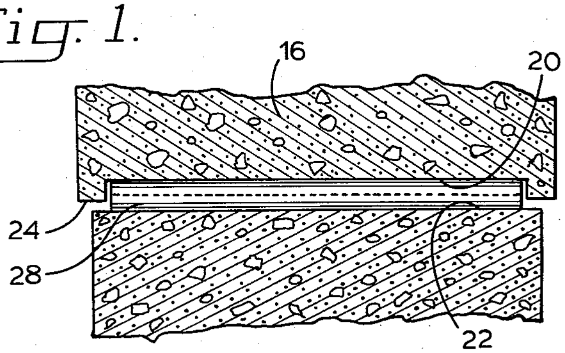
FIG. 3 is a cross-sectional view taken along the line 3—3 of FIG. 2.

FIGS. 2 and 3 illustrate the bearing member of the invention as such appears when incorporated between structural members 16, 18 to accommodate low friction relative displacement of these two members. Structural member 18 includes a flat upper face 22 and member 16 a downwardly facing flat face 20 between opposed shoulders 24. Bearing members 26, 28 are positioned parallel to each other between faces 20, 22 with the axes of these bearing members normal to the direction in which relative displacement of the structural members is expected, which is across the page in FIG. 2.

It should be obvious from viewing FIG. 2 that with movement of structural member 16 to the right, upper wall portions of the flattened bearing member slide over lower wall portions. There is some displacement of the bearing members to the right, but this distance of displacement is a fraction of the distance that the upper member moves with respect to lower member 18. With displacement of a bearing member, that part of the wall of a bearing member which is reversely turned is moved into a flattened state, with succeeding wall portions becoming reversely turned to take its place.

It will be noted that the bearing member can be selected to have a size providing a substantial contact area between the two structural members, substantially greater, for instance, than the line contact provided in a cylinder. The lubricating medium within the bearing member is captured therein with the bearing member in its flattened condition. The bearing member also provides a cushion cushioning one structural member from the other thereby to inhibit transmissions of shocks, vibrations, etc.

Figure 4:
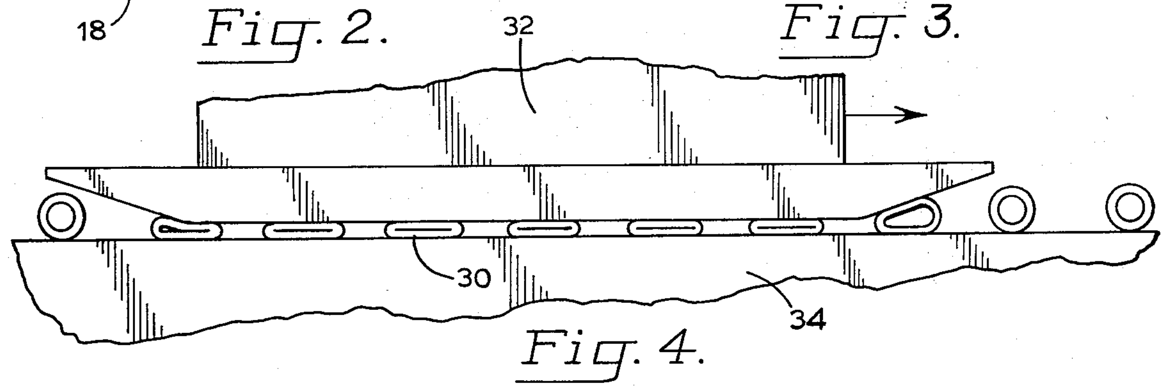
FIG. 4 illustrates yet another form of the invention, wherein multiple bearing members are interposed between opposed structural members.

FIG. 4 illustrates yet another form of the invention, where multiple bearing members 30 are provided between structural members 32, 34 to accommodate low friction movement of member 32 over the top surface of member 34. The bearing members, again, are parallel to each other, have axes extending normal to the direction of travel of structural member 34, and have a flattened condition with opposed side wall portions sliding on each other when under load and during movement of the structural member 34.

With reference to FIGS. 5 and 6, a portion of a cylindrical wall of a tank for holding fluid, such as a reservoir, is shown at 40. Such normally may be made of concrete and may be prestressed by including encircling strands under tension extending about the outer periphery of the wall, such not being illustrated in the drawing. The wall is supported on a base 42, including a portion 44 which forms the floor of the tank, and an annular channel 46 which seats the bottom extremity or end of tank wall 40.

Interposed between the bottom end of wall 40 and the flat bottom of channel 46, and extending in an annular course underneath wall 40, is a flattened bearing member 48. The member may be prepared from a finite length of tube which has opposite ends brought together and coupled together, as with tubular coupling member or means 50 shown in FIG. 5. The bearing member when installed, therefore, extends in a circular course paralleling annular channel 46 and the base of the wall 40. The coupling means may be made with perforations, such as shown at 52, to permit the expressing of air from inside the bearing member which occurs on being reduced to a flattened state. Alternatively, air may be withdrawn from the interior of the tube and the ends coupled with the tube already in its flattened condition.

In the installation illustrated in FIG. 6, the bearing member again permits relative displacement of the upper structural member, namely wall 40, with respect to the lower one, namely base 42. The coupling member functions additionally to cushion the mounting of wall 40 on base 42 with liquid, i.e., water, carried within the tank. The tube further provides a seal preventing leakage of water underneath the base of wall 40.

Instead of the single bearing member shown in FIG. 6, multiple bearing members may be employed comprising tubes of smaller diameter than shown in FIGS. 5 and 6 interposed between the bottom end of wall 40 and the flat bottom of channel 46, such being concentrically arranged so that such would appear side-by-side in a cross-sectional view such as shown in FIG. 6. By utilizing smaller tubes, economies may sometimes be realized, there is good "tracking" of the tubes on relative movement of the wall with respect to the base, and a water seal or "stop" is present even though one of the tubes should fail.

The bearing member contemplated, in summary, can be produced at low cost. It is easily prepared at any of different lengths. The bearing members are adapted to handle either vertical movements or horizontal movements or any combination of such. When included in a water storage tank, they provide a seal or stop prohibiting the leakage of water at the base of the tank.

It is claimed and desired to secure by letters patent:

1. An installation adapted to carry a body of fluid comprising a base, an endless side wall mounted on said base exerting a force downwardly on the base, and a substantially endless bearing member intermediate the side wall and base providing a seal inhibiting leakage of the fluid, said bearing member extending in a course substantially paralleling said endless side wall, said bearing member comprising a collapsed and flattened tube of flexible elastomeric material, said tube in a relaxed and unstressed state being hollow and having flexible coating of lubricant material of substantially uniform thickness coated on the inner surface of the tube, said coating of lubricant material with said tube in a relaxed and unstressed state enveloping a hollow space within the tube, said hollow space within the tube being vented to the atmosphere and such venting permitting the tube under load to have a collapsed and flattened condition, the coating of lubricant material promoting relative sliding movement of opposed wall portions in the flattened tube tending to be induced by relative movement of said side wall relative to the base.

2. The combination of a pair of structural members disposed with one exerting a force directed against the other, and an anti-friction bearing member disposed intermediate the structural members where such force is exerted, said bearing member comprising a collapsed and flattened tube of flexible elastomeric material, said tube in a relaxed and unstressed state being hollow and having a flexible coating of lubricant material of substantially uniform thickness coated on the inner surface of the tube, said coating of lubricant material with said tube in a relaxed and unstressed state enveloping a hollow space within the tube, said hollow space being vented to the atmosphere and such venting permitting the tube under load to have a collapsed and flattened condition, the coating of lubricant material promoting with the tube under load relative sliding movement of wall portions in the tube which are opposite each other and in sliding contact with each other through said coating.

3. The combination claimed in claim 2, wherein the one structural member exerts a force on the other structural member throughout an annular zone defined at an extremity of said one member, and said bearing member extends in an annular course lying adjacent said annular zone.

4. The combination of claim 2, wherein the bearing member comprises an element of finite length, and multiple bearing members are disposed intermediate the structural members with such occupying a common plane and paralleling each other in said plane, said plane lying intermediate the structural members and the one member exerting a force on the other structural member through said plane.

5. An anti-friction bearing member comprising a hollow tube of flexible elastomeric material having a flexible coating of lubricant material of substantially uniform thickness coated on the inner surface of the tube, said coating of lubricant material with said tube in a relaxed and unstressed state enveloping a hollow space within the tube, said hollow space within the tube being vented to the atmosphere and such venting permitting the tube under load to have collapsed and flattened condition, the coating of lubricant material promoting, with the tube in a flattened condition, relative sliding movement of wall portions in the tube which are opposite each other.

6. The bearing member of claim 5, wherein the tube extends in an annular course.

7. The bearing member of claim 5, wherein the tube comprises an element of finite length.

8. The bearing member of claim 5, wherein the tube comprises an element of finite length, the tube extends in an annular course, and a tubular coupling means couples opposite ends of the tube.

* * * * *

UNITED STATES PATENT AND TRADEMARK OFFICE

CERTIFICATE OF CORRECTION

PATENT NO. : 4,070,836

DATED : January 31, 1978

INVENTOR(S) : Arthur M. James; Edgar Terry Dalton

It is certified that error appears in the above-identified patent and that said Letters Patent are hereby corrected as shown below:

Column 1, line 47, delete "enables" and substitute therefor —enabled—;

Column 4, line 34, after "having" insert —a—.

Signed and Sealed this

*Tenth* Day of *October 1978*

[SEAL]

*Attest:*

RUTH C. MASON
*Attesting Officer*

DONALD W. BANNER
*Commissioner of Patents and Trademarks*